United States Patent [19]
Lehmbeck

[11] 3,861,804
[45] Jan. 21, 1975

[54] INFEROMETRY READOUT OF PHASE INFORMATION

[75] Inventor: Donald R. Lehmbeck, Penfield, N.Y.

[73] Assignee: Xerox Corporation, Stamford, Conn.

[22] Filed: Feb. 26, 1973

[21] Appl. No.: 336,136

Related U.S. Application Data

[63] Continuation of Ser. No. 130,360, April 1, 1971, abandoned.

[52] U.S. Cl. ............................................. 356/108
[51] Int. Cl. ............................................. G01b 7/02
[58] Field of Search .......... 356/106, 108, 112, 113, 356/107, 109, 110, 158

[56] References Cited
UNITED STATES PATENTS

| | | | |
|---|---|---|---|
| 2,261,192 | 11/1941 | Townsend | 356/158 |
| 2,338,981 | 1/1944 | Straub | 356/108 |
| 3,238,839 | 3/1966 | Day, Jr. | 356/108 |
| 3,286,582 | 11/1966 | Mertz | 356/106 |

Primary Examiner—William L. Sikes
Assistant Examiner—Conrad Clark
Attorney, Agent, or Firm—Robert J. Bird

[57] ABSTRACT

Phase information recorded in the form of thickness or refractive index variations in a transparent member is detected by directing converging, temporally coherent light onto the transparent member. The intensity of the interfering light reflected from the top and bottom of the transparent member provides a direct readout of thickness or refractive index for the discrete area examined. The intensity variations of the interfering light observed during a scan of the transparent member provide information about the magnitude of the thickness or refractive index changes recorded by the member.

2 Claims, 4 Drawing Figures

PATENTED JAN 21 1975

INVENTOR
DONALD R. LEHMBECK

BY Michael H Shanahan

ATTORNEY

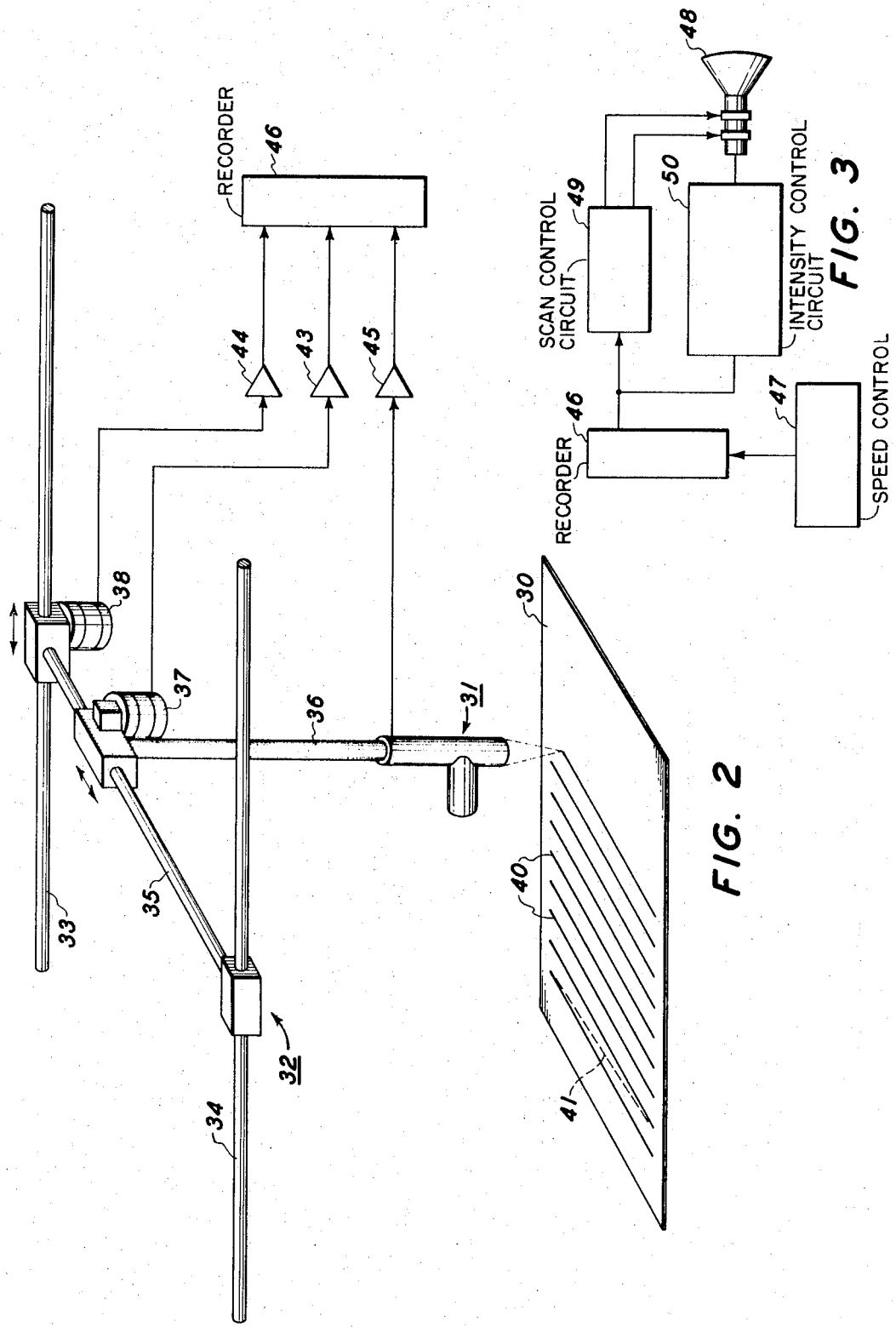

INFEROMETRY READOUT OF PHASE INFORMATION

CROSS REFERENCE TO RELATED APPLICATION

This application is a continuation of my application Ser. No. 130,360 filed April 1, 1971 and now abandoned.

BACKGROUND OF THE INVENTION

This invention relates broadly to imaging systems and more specifically to methods and apparatus for detecting and observing optical phase information.

The human eye responds to variations in light intensity or amplitude and is insensitive to the phase relations of light unless it results in intensity variations. This means, for example, that changes of refractive index and thickness of a transparent material are nearly undetectable to the human eye when viewed in normally encountered ambient lighting. These index and thickness variations can be seen indirectly by methods employing principles of Schlieren type optics or interferometry. Heretofore, Schlieren type optics has been a primary means for viewing information recorded in terms of thickness or index variations, i.e., optical phase information. A typical scheme is to periodically vary the thickness or refractive index of a transparent material over a relatively large area (as compared to the changes) shaped in the form of an image. The Schlieren optics yield a high contrast image that varies in light and darkness, i.e., tone, according to the magnitude of the thickness or index changes over a given area. No information is readily available in regard to the individual depression or refractive index variation in these systems because the intensity variations made available to the eye or other photodetectors are complex interference patterns. Furthermore, conventional interferometers are complex instruments requiring vibration free environments. Consequently, they are generally regarded as economically unsuited for imaging systems.

Examples of imaging systems that record information as variations in thickness of a transparent material include thermoplastic deformation systems such as those described in U.S. Pat. Nos. 3,196,011; 3,133,179; 3,055,006; 3,436,216; 3,560,205.

Accordingly, it is an object of the present invention to devise novel methods and apparatus for detecting, observing and evaluating information recorded in a manner to affect the phase of light, i.e., electromagnetic radiation.

Another object of this invention is to apply interferometry principles to imaging systems and to define novel high resolution interferometry methods and apparatus.

Still another object of the instant invention is to overcome the above-noted and other problems associated with the application of interferometry to imaging systems.

Another object of the present invention is to develop novel methods and apparatus for examining and evaluating small changes in refractive index and thickness in transparent materials and in particular the variations formed in the above-noted imaging systems.

Finally, it is an object of the present invention to expand the applications of imaging systems of the type wherein information is recorded in terms of changes in refractive index or thickness by employing novel recording and readout techniques.

These and other objects of the instant invention are realized by adapting interferometry techniques for the direct observation of variation of thickness or refractive index in transparent members. The variations in thickness or refractive index, when logically organized, comprise information which is referred to herein as "phase information". When the phase information constitutes a line copy object, a continuous tone object or a holographic interference pattern, for example, it is referred to as a "phase object." Imaging systems of the type wherein phase objects are utilized are referred to as "phase imaging systems."

In the case of phase objects exhibiting variations in thickness, one surface of the transparent member is deformed and the other surface is comparatively flat. In the case of variation in refractive index, the surfaces of the transparent member are substantially parallel. The index or thickness profile is observed, according to the present invention, by directing a converging, temporally coherent or quasi-monochromatic light beam onto a discrete area of the transparent member and by observing the changes in intensity resulting from constructive and destructive interference of the light reflected from top and bottom surfaces of the transparent member. The intensity varies because the phase relation between the light reflected from the two surfaces is shifted wherever the thickness, i.e., optical path length, or refractive index change. The present procedure differs from conventional interferometry in several aspects. For one, most conventional interferometers utilize non-converging light beams. For another, the reference beam in conventional techniques is generated externally to the member being examined. Also, the present scheme requires less stringent isolation from vibrations because the surfaces from which interfering light is reflected are rigidly coupled together. Most significantly, the present system provides resolution of an order of magnitude greater than conventional interferometers. The resolution improvement arises because no external reference surface, whether reflective or transparent, is present as is the case with conventional interferometers.

The present methods and apparatus provide a novel readout technique for the above referenced thermoplastic and elastomer deformation imaging systems, in which the phase object is composed of surface deformations of varying amplitude (tone) and fixed spatial frequency. By means of the present invention the phase object is scanned at a predetermined rate with the above described converging, temporally coherent light and the instantaneous intensity of the interfering light is monitored by a photodetector. The intensity passes through maxima everywhere the change in deformation amplitude equals a multiple wavelength of the scanning light. At the lowest deformation amplitudes, the intensity maxima occur at a fundamental frequency related to the spatial frequency of the deformations. As the deformation amplitude increases, the intensity maxima occur at a higher frequency herein called an interference fringe frequency. The fundamental and fringe frequencies thereby provide information about the tone of the phase image. Consequently, a visual image can be constructed on a cathode ray tube (CRT), or other display device, from the frequency spectra of the intensity maximas.

DESCRIPTION OF THE DRAWINGS

Other objects and features of the present invention will be apparent from a further reading and from the drawings in which:

FIG. 2 is a schematic of a mechanism for propelling the apparatus of FIG. 1 to effect a two dimensional scan of a phase object.

FIG. 3 is a schematic of electrical circuitry for reconstructing an image with a CRT from the scanning information generated by the apparatus in FIG. 2.

DESCRIPTION

Figure 1:
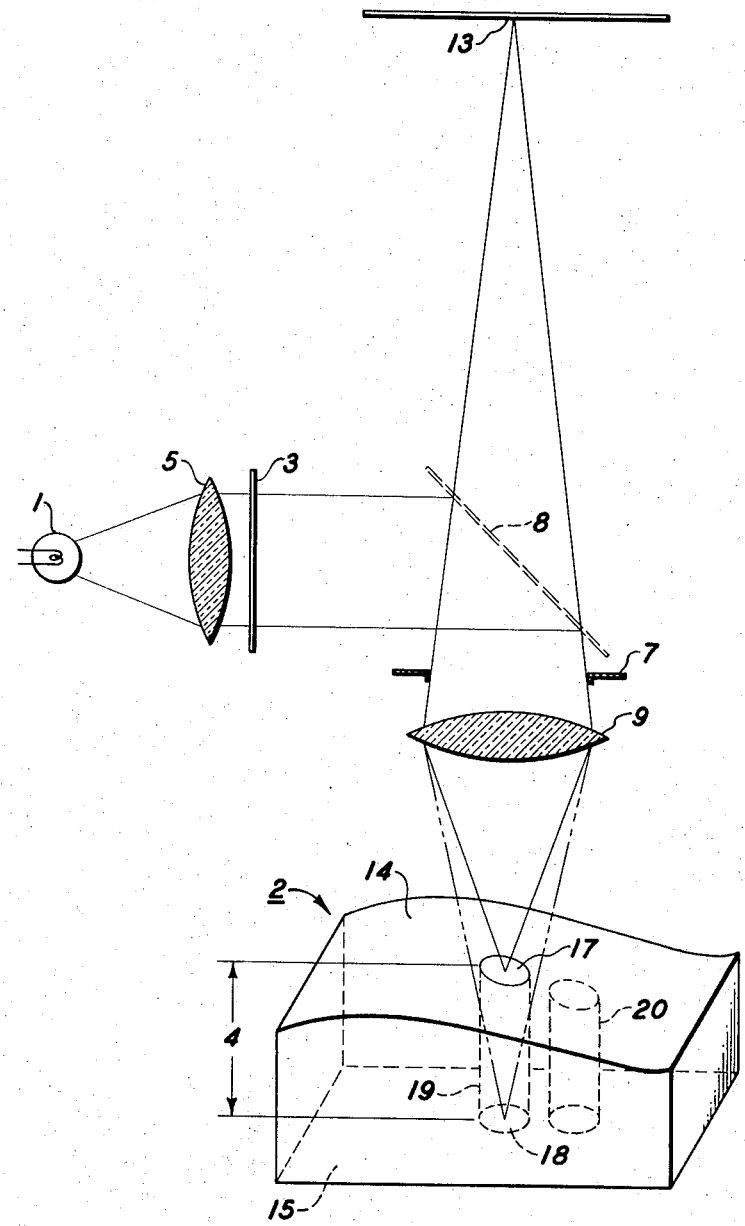
FIG. 1 illustrates the method and apparatus of the present invention and includes a perspective schematic of a converging light beam directed onto a segment of a transparent member of varying thickness.

Phase information is detected and observed according to the present invention by using the methods and apparatus illustrated in FIG. 1. The following discussion is directed to treatment of phase objects composed of thickness variations but the same description is substantially applicable to treatment of phase objects composed of refractive index variations. Lamp 1 is a conventional tungsten, carbon arc or equivalent electromagnetic radiation source whose output for present purposes is considered polychromatic. The light (electromagnetic radiation) generated by the lamp is focused onto the varying thickness, transparent member 2, hereinafter called the phase information, phase record or phase object. The light is focussed onto the phase object by a lens system including an interference filter 3 that passes temporally coherent radiation having a long coherency length compared to the thickness 4 of the phase record.

The lens system also includes a condensing lens system 5, an aperture 7, beam splitter 8, and an objective lens system 9. An image of an object located at the phase record is formed by the objective lens at th plane of observation 13. The system just described is substantially a bright field, vertically illuminated microscope. One difference includes interference filter 3 used to impart coherency to the reference light.

The thickness 4 of the phase record is relatively small such that the described lens system can be considered to focus a small spot of light onto both the top 14 and bottom 15 surfaces of the phase record. The reflectivity of these two surfaces should be substantially the same or at least within a factor of 10 to 20 so that the intensity variations of the interfering light reflected from them is detectable. The optimum performance is obtained when the reflectances are substantially the same.

The results obtained by the present invention may be explained with the following theory. The light directed onto the phase record 2 has a coherency length greater than the thickness 4 of the phase record. Only light reflected from small areas 17 and 18 on the top and bottom surfaces of the record is able to overlay and combine interferometrically. (The cylinders 19 and 20 defined by the small areas 17 and 18 are termed resolution volumes.) The intensity I$ij$ of the interfering light reflected from the two discrete surfaces 17 and 18 is given by the expression:

$$I_{1ij} = I_o [R_{1ij} + R_{2ij} - \gamma \sqrt{R_{1ij}} \cdot \sqrt{R_{2ij}} \cdot 2 \cos \Delta\phi i \,] \quad (1)$$

where $R_{1ij}$ and $R_{2ij}$ are the reflectivity of areas 17 and 18; $\gamma$ is the coherence factor; $I_o$ is the intensity of the incident light; and $\Delta\phi ij$ represents the change in phase between the light reflected from surfaces 17 and 18. The definition of Iij assumes uniform intensity of light striking areas 17 and 18 and small reflection coefficients. The entire phase record is considered to be made up of a plurality of cylinders or resolution volumes such as cylinders 19 and 20 and the subscripts $i$ and $j$ are the x-y location coordinates for the cylinders. Since $$\Delta\phi ij = ntij/\lambda + \Delta\phi' \quad (2)$$

where $n$=refractive index; $tij$=cylinder height (thickness 4); $\lambda$=wavelength of the light; and $\Delta\phi'$ =phase difference caused by the surfaces 17 and 18; the total phase record may be mapped by variation in intensities due to variations in $t$ (or due to variations in $n$). Maxima and minima (one cycle) will be seen every place $\Delta\phi 1ij$ undergoes a change of $2\pi$ or everywhere that $t$ undergoes a change of $2\pi(\lambda/n)$. Equation 1 requires the coherence factor $\gamma$ to be large for the inteference term to be significant. Temporal coherence governs the interference of light reflected from surfaces 17 and 18 while spatial coherence controls interference of light reflected from laterally separated surfaces such as the tops of cylinders 19 and 20. Consequently, temporal coherence is more important here than spatial coherence.

The resolution provided with the present invention extends beyond 2,000 lines per millimeter which is about 10 times greater than the resolution of conventional interferometers. The higher resolution is possible because the objective lens is focussed directly onto the interference pattern located on the surface of the test object. By comparison, the objective lenses in prior art interferometers look at the interference pattern through a transparent, optically flat member or the object-modulated and reference beams are not combined to form the interference pattern until each beam has passed through a plurality of mirrors, lens and other optical members that introduce mechanical and optical problems.

The resolution of the present system is controlled by changing the spread function of the objective lens. The spread function is varied by methods including changing the diameter of aperture 7. Because of the high resolution, it is preferred that the coherence length of the light be shorter than that normally provided by a laser so that the influence of defects in the optical system on the interference pattern are minimized. A laser is, of course, an acceptable monochromatic electromagnetic radiation source that can be substituted for the lamp 1 and interference filter 3.

The present interferometry technique is unique because of its use of a surface on the test object as a reference surface. The immediate benefit provided by this technique is the high resolution. Low resolution, on the other hand, is deliberately introduced into the system for another purpose. This purpose is the direct readout of pictorial information. When the converging light is directed over the entire area of the phase record using a low resolution aperture 7, the individual deformations are not detectable but the recorded pictorial or visual information can be seen. Furthermore, by changing the wavelength of the converging light both positive and negative image senses are obtained.

A photograph of the image projected to observation plane 13 may be made in any of the described embodiments of this invention. Present practice is to employ a Polaroid Camera to obtain a permanent record of the observed information. Permanent recording systems other than the Polaroid Camera or other systems based on silver halide films may also be employed.

The local thickness of a transparent member is determinable, according to the present invention, simply by observing the intensity profile produced by the interferometer. This observation is made at the plane of observation 13. The intensity profile when calibrated or compared to a standard is directly representative of thickness. In addition, local thickness is demonstrated by comparing the intensity at one spot to that of a neighboring spot. A contour map of the phase record (an interferogram) is readily obtainable by moving the converging light over the surface area of the record. Several fringes may be viewed without moving the light relative to the record when the focal spot of the converging light has a diameter larger than the smallest resolution element; namely, surface 17.

The filter 3 is a vital element in the system of FIG. 1. The filter is a continuous frequency interference filter which includes a transparent material of fixed refractive index but continuously varying thickness. The filter passes a continuous spectrum of wavelengths each of which exhibit temporal coherence lengths greater than the thickness 4 of the phase record 2. A fixed wavelength laser or more limited wavelength filter may also be used.

A unique application of interferometry to phase imaging systems is illustrated in FIGS. 2 and 3. A deformation object 30, thermoplastic or elastomer for example, formed according to the methods disclosed in the above referenced patents and co-pending applications, is shown in FIG. 2. Specifically, the phase object 30 is comprised of a fixed spatial frequency deformation pattern, such as parallel lines, whose amplitude or peak to peak height varies continuously. The different peak amplitudes represent varying tones in a visual image. The spatial frequency of the deformation is often as high as 500 lines per millimeter which is the resolution desired for recording holographic interference patterns and microimages. Deformations of this spatial frequency are not detectable by the human eye. However, deformations of frequencies beyond 2,000 lines per millimeter are visible when viewed with the apparatus of FIG. 1. (These high frequency phase images have application in electrical data handling systems such as digital computers.) In a microscope, an ocular is used to view the image at the observation plane 13 to give more magnification.

The interferometer 31 in FIG. 2 is substantially similar to the apparatus in FIG. 1 except a photomultiplier or other light intensity detector is positioned at observation plane 13. The photodetector is coupled to electrical circuitry to generate electrical signals corresponding to light intensity variation seen by the photodetector.

The interferometer 31 is mechanically coupled to the drive mechanism 32 comprised of the fixed rails 33 and 34, the traveling slide 35 and the mobile carriage 36. The electric motor 38 coupled to the slide propels the slide back and forth along the rails. The electric motor 37 coupled to the carriage propels it back and forth along the slide. Consequently, the interferometer is supported for a line-by-line scan of the phase object 30. The lines 40 represent a possible scan path followed by the interferometer while the dash lines 41 represent a fly-back path. The mechanical tolerances of the drive mechanism are selected to maintain the objective lens system of the microscope in focus.

The speed of the interferometer as it travels a scan line is constant. The electric signal generated by the photodetector includes a fundamental frequency that is directly proportional to the spatial frequencies in the phase image. Fringe frequencies are generated when the deformation amplitudes increase. Specifically, a fringe frequency is generated eacy time the thickness 4 of the phase record changes by an amount $\lambda/2n$ where $\lambda$ is the wavelength and $n$ is the refractive index. From equation (2) above, it is apparent that the intensity $Iij$ goes through a maximum every time the thickness changes by $\lambda/2n$. Consequently, a first fringe frequency is generated when the deformation amplitudes exceed a first magnitude and second, third, fourth and etc. fringe frequencies are generated at incrementally increasing amplitudes. This operation is illustrated by the three part diagram in FIG. 4.

Figure 4:
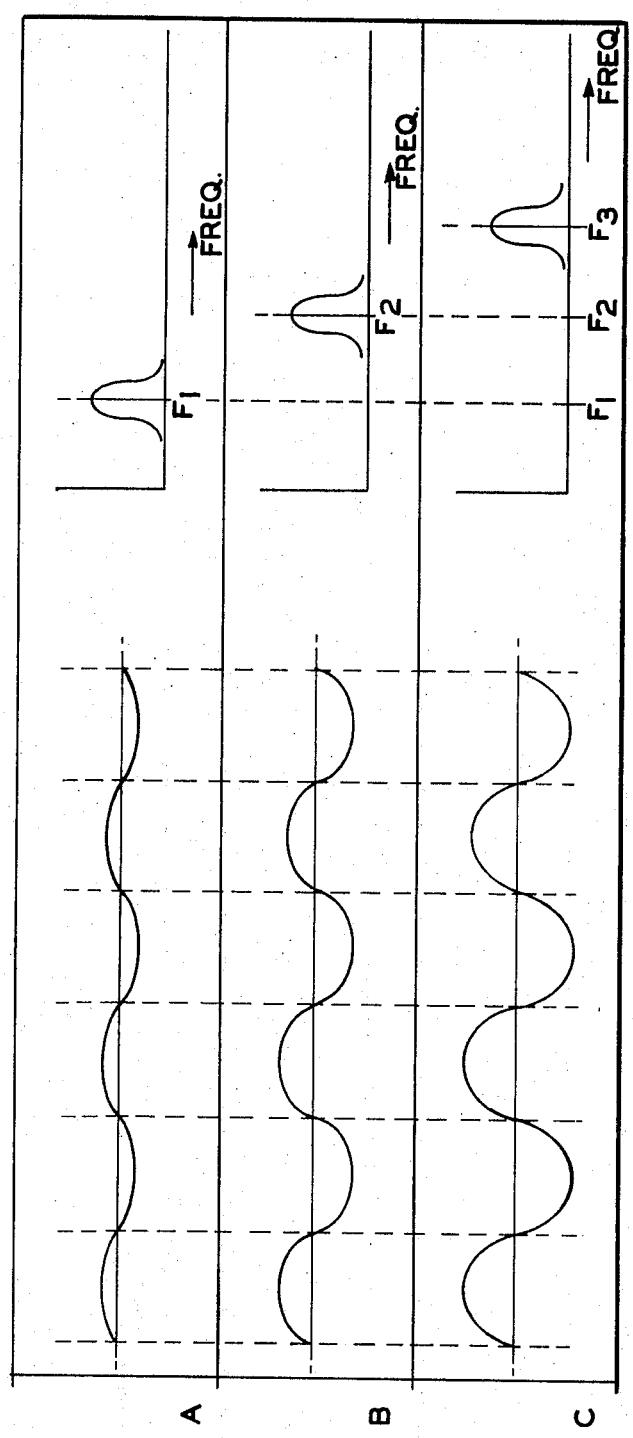
FIG. 4 is a three part (A through C) diagram illustrating deformation phase information of fixed spatial frequency and increasing amplitude as well as the corresponding fundamental and fringe frequencies generated by the intensity maximas.

The left hand side of the three parts (A through C) of FIG. 4 represent the fixed frequencies but changing peak to peak amplitude of deformations in phase object 30. The right hand sides of the three parts A through C represent the corresponding plot of $Iij$ maxima versus frequency. In part A, the peak to peak amplitude of the deformation is less than $\lambda/2n$ (or a multiple thereof), therefore, maxima occur at a fundamental frequency $f_1$ proportional to the spatial frequency of the deformations. In part B, the peak to peak amplitude exceeds the reference amplitude in part A by $\lambda/2n$. Consequently, the maxima in part B occur at a higher frequency $f_2$, herein called a fringe frequency. Similarly, in part C the peak to peak amplitude is increased over that in part A by several multiples of $\lambda/2n$ thereby giving rise to the higher fringe frequency $f_3$. The photodetector in the interferometer 31 generates electrical signals having frequencies corresponding to the fundamental and fringe frequencies. These electrical signals are monitored by appropriate circuitry and are used to construct a visual image as is explained more fully below.

A sufficient quantity of fringe frequencies may be generated to enable a substantially continuous tone image having a large dynamic range to be reconstructed. The reason is that the deformations can range from less than $\lambda/2n$ to as many as a 100 times that quantity since the actual thicknesses in question are very small and well within the capability of the deformable material comprising the phase object. The foregoing system thus represents a novel method and apparatus for readout of phase images.

Returning now to FIGS. 2 and 3, the electrical signals generated during the travel of interferometer 31 over the phase object 30 are synchronized with the electrical $x$ and $y$ position signals generated at the electric motors 37 and 38. These intensity and position signals are appropriately processed by the amplifiers 43, 44 and 45 and recorded by suitable means 46 such as a magnetic tape recorder. The recorder is used so that the scanning rate of the interferometer can be substantially different from the scanning rate used to construct an image from the recorded information.

FIG. 3 illustrates one system for constructing an image from the recorded intensity and position signals. The speed control unit 47 scales the playback rate of the tape to adjust the scanning rate of the interferometer 31 to that of the CRT 48. The recorded *x* and *y* position signals are fed to appropriate circuitry 49 which in turn drives the electron beam of the CRT in a prescribed raster pattern. Simultaneously, the recorded intensity signals are fed to the intensity control on the CRT through appropriate circuitry 50. The recorded intensity signal may comprise the actual detected fundamental and fringe frequencies or an AC or DC signal representative of the deformation frequency and amplitudes.

The system disclosed by FIGS. 2 and 3 is intended to be illustrative and not limiting. For example, appropriate circuitry of known design may be employed to drive the CRT directly from the interferometer intensity and positions signals. In addition, scanning patterns other than the parallel scan pattern shown in FIG. 2 may be employed and the scanning rate may be varied rather than maintained constant. The rail and slide scanning drive mechanism can be replaced by a rotating cylinder, galvenometer, helical slit or other scanning apparatus. Other modifications may occur to those skilled in the art and all are intended to be within the scope of the present invention.

What is claimed is:

1. Apparatus to detect and record variations in the optical thickness of an extended phase object, including:
   a source of temporally coherent light,
   optical means to direct said light onto a phase object and to image the reflections of said light from said object,
   a first electric motor operatively connected to said optical means to reciprocate the same in an X direction,
   a second electric motor operatively connected to said optical means to reciprocate the same in a Y direction,
   an electrical photodetector in optical communication with said image of said object and responsive to intensity variations thereof to generate intensity signals,
   a recorder operatively connected to said photodetector, said first motor, and said second motor to record intensity signals from said photodetector and position signals from said motors, and
   a visual display device operatively connected to said recorder to convert electrical signals from said recorder to a visible two dimensional contour representation of said phase object.

2. Apparatus as defined in claim 1 including means to control the speed of output of said recorder so as to render the display on said visual display device adjustable.

* * * * *